Sept. 11, 1934.  J. LEVORCHICK ET AL  1,973,083
SANDING DEVICE FOR AUTOMOBILES
Filed Feb. 17, 1933
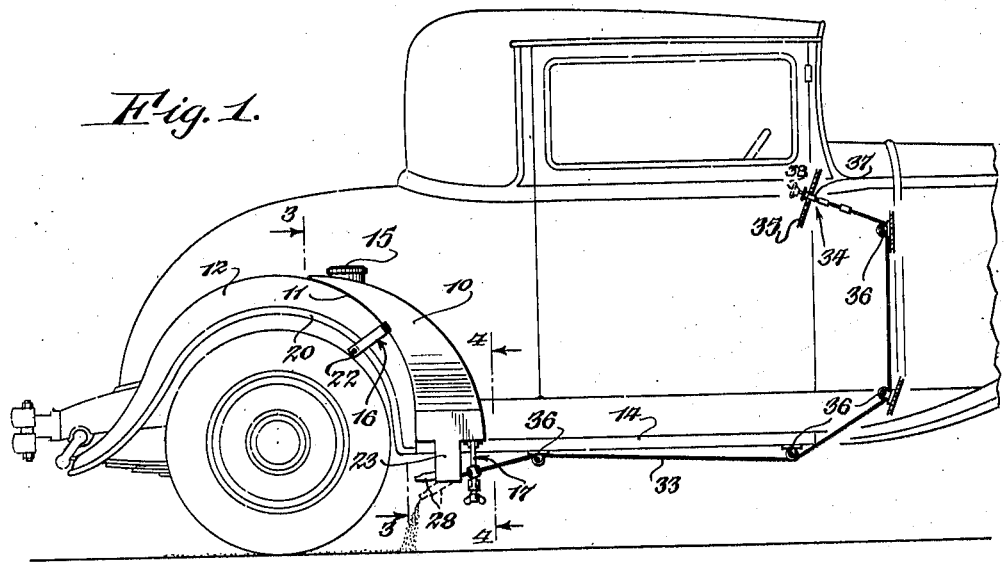
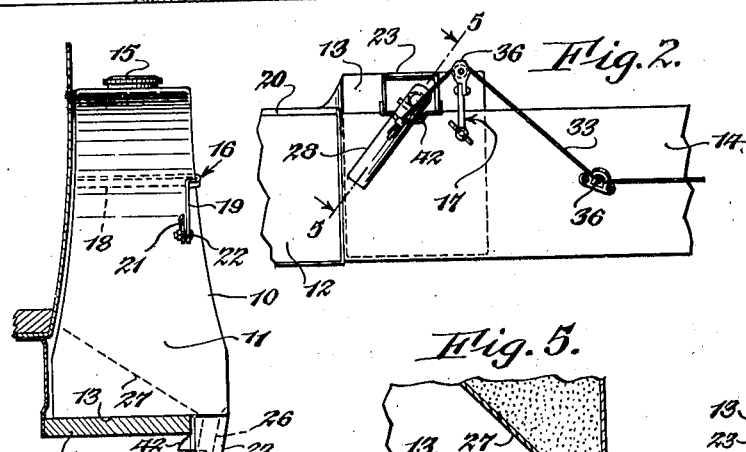
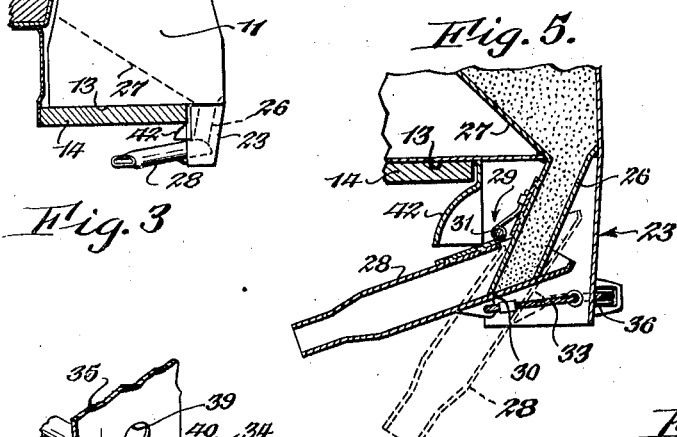
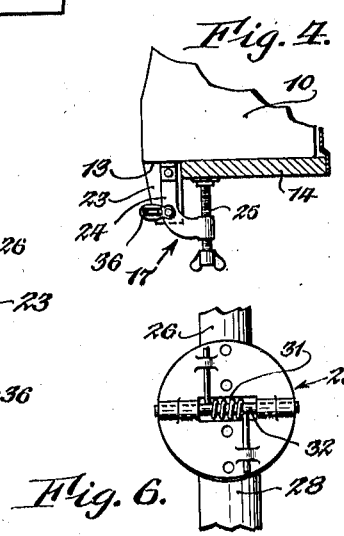
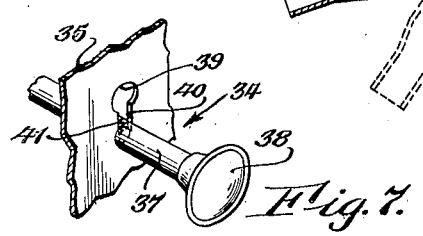
INVENTORS
Joseph Levorchick and
John Levorchick
By Popp and Powers
ATTORNEYS Patented Sept. 11, 1934

1,973,083

UNITED STATES PATENT OFFICE 1,973,083

SANDING DEVICE FOR AUTOMOBILES

Joseph Levorchick and John Levorchick,
Buffalo, N. Y.

Application February 17, 1933, Serial No. 657,219

3 Claims. (Cl. 291—25)

This invention relates to a device for use in connection with an automobile and is operable, at will, to discharge sand or a similar material in the path of the wheels of the automobile, whereby to increase the traction of the said wheels and prevent them from skidding either while power is applied to them to drive the automobile, or when the brakes are applied to stop the automobile.

One object of the invention is to provide a device of the character generally described in which the parts are so designed as to facilitate the discharge of the material which is employed to increase the traction of the wheels.

A further object is to provide a novel construction and arrangement of those parts of the device by which the discharge of the said material is controlled.

A still further object is a device in which provision is made for protecting those parts which are located in the vicinity of the wheels against the accumulation of foreign matter, whereby to prevent locking of the parts against movement.

A still further object is to provide a device which may be applied, as an attachment, to existing types of automobiles.

The invention is illustrated in the accompanying drawing, in which:

Figure 1 is a side elevation of an automobile of standard construction to which a device embodying features of the invention is applied as an attachment.

Figure 2 is an enlarged fragmentary view of the bottom of the device and the associated parts of the vehicle.

Figure 3 is a section taken along line 3—3 of Figure 1, the device being shown in elevation.

Figure 4 is a fragmentary section taken along line 4—4 of Figure 1.

Figure 5 is an enlarged section taken along line 5—5 of Figure 2.

Figure 6 is a fragmentary view of the parts of the device which regulate the discharge of the material.

Figure 7 is a detail view of the control means for the said parts.

The device, as illustrated, includes a hollow body 10 which is adapted to provide a reservoir for the material which is to be used to increase the traction of the wheel of the vehicle with which it is employed, the said device being formed with a rear wall 11 which fits conformably against the fender 12 of the vehicle and a bottom wall 13 which is adapted to rest upon the running board 14 of the vehicle. The body 10 is formed adjacent its top with a suitable opening through which the material may be introduced, the said opening being closed by a removable cap 15.

The body 10 is secured in the position shown by a strap 16 and a clamp 17. The strap is formed with a portion 18 which passes through the body 10, the said portion being suitably secured against the rear wall 11 thereof. The strap includes an arm 19 which extends beyond the beaded edge 20 of the fender. A clamping element 21 (Figure 3) which overlies the inner side of the beaded edge 20 is secured against the said edge by suitable fastening means 22. The bottom wall 13 of the body 10 projects outwardly beyond the marginal edge of the running board 14, the projecting part of the body being provided with a depending housing 23. The clamp 17 includes an arm 24 which is suitably secured to the bottom wall 13 of the body 10 at one side of the housing 23. The arm 24 is bent inwardly to underlie the running board 14, the inwardly bent portion of the arm carrying a screw 25. The latter is adjustable to engage the bottom of the running board and co-operates with the strap 16 in securing the body 10 to the vehicle.

That part of the body 10 which overlies the running board is formed or provided with a reduced tubular extension 26, the said extension being adapted to provide an outlet through which the material from said body is discharged. In order to facilitate discharge of the material the body 10 is provided with a false bottom 27 which is inclined toward the mouth of the extension 26 whereby the material will flow by gravity over the false bottom 27 to the mouth of the extension. Means is provided whereby discharge of the material through the extension 26 into the path of the wheel may be controlled at will. To this end a tubular section 28 is employed in connection with the extension 26. The section 28 is pivotally connected to the extension 26 by a hinge 29, the section and extension being formed and connected in such a manner that the former fits over the end of the latter. The said extension is formed with a beveled end 30 which co-operates with the section 28 in such a manner that when the latter occupies the full-line position shown in Figure 5 the outlet of the extension 26 is closed. Discharge of the material from the body 10 into the path of the vehicle wheel is, therefore, prevented. The section 28 is normally held in the full-line position shown by a spring 31. The latter is carried by the pintle 32 of the hinge 29 and the opposite ends are connected to the leaves of the hinge in any suitable manner.

Means is provided whereby the operator of the vehicle may regulate the device so as to effect discharge of the material from the body 10 into the path of the wheel of the vehicle and thereby increase the traction of the wheel. To this end the section 28 is connected by a cable 33 to a control element 34 which is mounted in the instrument panel 35 of the vehicle within convenient reach of the driver, the cable 33 being guided by suitable pulleys 36 which are carried by the clamp 17 and the body of the vehicle. The control element includes a stem 37 and a knob 38. The former is adapted for reciprocating movement in an opening 39 which is formed in the instrument panel 35. In order to effect discharge of the material from the body 10 into the path of the vehicle wheel the knob 38 is pulled outwardly thereby moving the section 28, against the action of the spring 31, to the position shown in dotted lines in Figure 5. Discharge of the material continues while the section 28 is held in this position. When it is desired to cut off the discharge of the material the knob 38 is released and the section 28 is restored to its inoperative position by the spring 31. The opening 39 is formed with a reduced portion 40 and the stem 37 is formed with a co-operating reduced portion 41, the reduced portions of the opening and stem 40 and 41, respectively, being so designed that when the knob 38 is pulled outwardly to move the section 28 to the position shown in dotted lines in Figure 5 it may be moved downward to position the reduced portion of the stem 37 in the reduced portion 40 of the slot whereby the parts may be locked against relative movement. Discharge of the material from the body 10 into the path of the wheel, therefore, will continue while the knob 38 occupies this position. In order to cut off the discharge of the material the knob 38 is moved upwardly into the enlarged portion of the opening 39 and released. Thereupon the spring 31 is automatically operative to restore the section 28 to its inoperative position.

It will be noted that the housing 23 surrounds the co-operating portions of the extension 26 and section 28, the said housing including a rearwardly extending wall 42 which overlies the hinge and spring 29 and 31 respectively. The housing 23 is adapted to prevent the accumulation of foreign matter upon the enclosed parts whereby to insure the efficient operation of the device.

In the use of the device it will be apparent that when the section 28 is moved to the position shown in dotted lines in Figure 5 an unobstructed path of communication is provided through the section 28 and extension 26 whereby the material flows freely through the said parts. It will be noted that the extension 26 and extension 28 are so arranged that when the parts are in the position described they are adapted to conduct the material directly to a point where when discharged the material falls by gravity into the path of the wheel. The invention, therefore, has the advantage that free flow of the material from the body 10 to the point of discharge is insured.

While the device is illustrated in connection with one of the wheels of the automobile, it is to be understood that this is for purposes of illustration only. Preferably one of the devices is employed in connection with each of the driving wheels of the automobile, the said devices being connected in any suitable manner to the control element.

We claim as our invention:

1. In a sanding device for a motor vehicle having a fender for a driving wheel thereof and a running board, the combination of a receptacle which is adapted to provide a reservoir for the material which is to be utilized to increase the traction of the said wheel, said receptacle having a rear wall which fits conformably against the said fender and a bottom wall which rests upon said running board, said bottom wall extending outwardly beyond the marginal edge of said running board, a conduit which consists of companion sections, one of said sections communicating with said receptacle and being carried by that portion of the bottom wall which extends outwardly beyond said marginal edge, the other of said sections being movable to one position in which communication is established through both of said sections to said reservoir and being movable to a second position in which the path of communication between the sections is cut off, a hinge connection between said sections, resilient means for normally holding said other section in said last named position and means for moving said other section to said first named position against the action of said resilient means, said companion sections being arranged in a substantially straight line when said other section is moved to said first named position, whereby to facilitate flow of the material into the path of said wheel.

2. In a sanding device for a motor vehicle having a fender for a driving wheel thereof and a running board, the combination of a receptacle which is adapted to provide a reservoir for the material which is to be utilized to increase the traction of the said wheel, said receptacle having a rear wall which fits conformably against said fender and a bottom wall which rests upon said running board, said bottom wall extending outwardly beyond the marginal edge of said running board and having an outlet formed in that part of said bottom wall which extends beyond said marginal edge, a conduit which consists of companion sections, one of said sections communicating with said receptacle through said opening, the other of said sections being movable to one position in which communication is established through both of said sections to said reservoir and being movable to a second position in which the path of communication between the sections is cut off, a hinge connection between said sections, resilient means for normally holding said other section in said last named position, a depending casing carried by said receptacle for enclosing all of said first mentioned section and a part of said other section, said casing being cut away at one side to accommodate said other section when it occupies the position in which it closes the end of said first mentioned section, said casing being flared outwardly above said cut-away portion so as to overhang to a substantial degree said hinge connection, and means for moving said other section to said first named position against the action of said resilient means, said companion sections being arranged in a substantially straight line when said other section is moved to said first named position, whereby to facilitate flow of the material into the path of said wheel.

3. In a sanding device for a motor vehicle having a fender for a driving wheel thereof and a running board, the combination of a receptacle which is adapted to provide a reservoir for the material which is to be utilized to increase the traction of the said wheel, said receptacle having a rear wall which fits conformably against said fender and a bottom wall which rests upon said running board, said bottom wall extending outwardly beyond the marginal edge of said running board and having an outlet formed in that part of said bottom wall which extends beyond said marginal edge, a conduit which consists of companion sections tubular in cross-section, one of said sections being carried by the bottom wall of said receptacle and being in communication with said receptacle through said opening, said section underlying said running board and having a beveled outlet end, the other of said sections being larger in diameter than said first mentioned section and being pivotally connected to said first mentioned section in such a manner that the end of said other section fits over said first mentioned section, said other section being movable to one position in which a side wall thereof engages the beveled end of said first mentioned section and closes the outlet thereof, a spring for normally holding said other section in such position and means for moving said other section against the action of said spring so as to align it with said first mentioned section, whereby to provide an open passage through said sections and permit the material to be discharged into the path of said wheel.

JOSEPH LEVORCHICK.
JOHN LEVORCHICK.